(12) United States Patent
Van Loon et al.

(10) Patent No.: US 9,315,705 B2
(45) Date of Patent: Apr. 19, 2016

(54) SEALANT COMPOSITION

(75) Inventors: Sander Van Loon, Amsterdam (NL); Gurami Kochibrolashvili, Den Haag (NL)

(73) Assignees: VAN LOON CHEMICAL INNOVATIONS B.V., Amsterdam (NL); KOCHITOON INNOVATIONS B.V., Den Haag (NL)

( * ) Notice: Subject to any disclaimer, the term of this patent is extended or adjusted under 35 U.S.C. 154(b) by 159 days.

(21) Appl. No.: 13/990,485

(22) PCT Filed: Nov. 30, 2011

(86) PCT No.: PCT/EP2011/005999
§ 371 (c)(1),
(2), (4) Date: May 30, 2013

(87) PCT Pub. No.: WO2012/072248
PCT Pub. Date: Jun. 7, 2012

(65) Prior Publication Data
US 2013/0245155 A1    Sep. 19, 2013

(30) Foreign Application Priority Data
Nov. 30, 2010    (EP) ..................................... 10015117

(51) Int. Cl.
*C08J 9/32*    (2006.01)
*C09K 3/10*    (2006.01)

(52) U.S. Cl.
CPC .................. *C09K 3/1006* (2013.01); *C09K 3/10* (2013.01); *C09K 2200/0239* (2013.01); *C09K 2200/0247* (2013.01); *C09K 2200/0622* (2013.01); *C09K 2200/0625* (2013.01)

(58) Field of Classification Search
CPC .................................................... C08K 3/1006
USPC .......................................... 523/122; 524/114
See application file for complete search history.

(56) References Cited

U.S. PATENT DOCUMENTS

| | | | |
|---|---|---|---|
| 4,456,728 A | 6/1984 | Garuti, Sr. et al. | |
| 4,806,590 A | 2/1989 | Padget et al. | |
| 5,753,742 A | 5/1998 | Bumanlag | |
| 2004/0092632 A1 | 5/2004 | Schultz et al. | |
| 2004/0181007 A1* | 9/2004 | Acevedo et al. | 524/589 |
| 2008/0295738 A1* | 12/2008 | Greenwood et al. | 106/446 |
| 2011/0077348 A1* | 3/2011 | Erdem et al. | 524/539 |

FOREIGN PATENT DOCUMENTS

| | | |
|---|---|---|
| DE | 41 35 678 A1 | 5/1993 |
| NL | 1005690 C2 | 10/1998 |

OTHER PUBLICATIONS

Database WPI, Week 198341, Thomson Scientific, London, GB; AN 1983-787489, XP002670586, & SU 979 469 A1 (Bugai N A) Dec. 7, 1982, Abstract.
Database WPI, Week 201108, Thomson Scientific, London, GB; AN 2010-K41027, XP002670587, & KR 2010 0088988 a (CI Chem Co Ltd) Aug. 11, 2010, Abstract.
Database WPI, Week 198203, Thomson Scientific, London, GB; AN 1982-05056E, XP002670588, & JP 56 159271 A (Kuraray Co Ltd), Dec. 8, 1981, Abstract.

* cited by examiner

*Primary Examiner* — Hannah Pak
(74) *Attorney, Agent, or Firm* — Hudak, Shunk & Farine Co. LPA

(57) ABSTRACT

A sealant composition having between 30 wt % and 60 wt % of a dispersion of a hydrophilic binder; between 30 wt % and 70 wt % of a filler; between 0.05 wt % and 1 wt % of a thickener, wherein the pigment volume concentration (PVC) is between 40% and 80%. A method for preparing such a sealant composition.

16 Claims, 4 Drawing Sheets

SEALANT COMPOSITION

FIELD OF THE INVENTION

The present application relates to a sealant composition comprising a binder and one or more fillers.

BACKGROUND OF THE INVENTION

Sealant compositions and their uses in construction technology are known in the art. An important function of a sealant composition is to keep moisture on one side of the construction and thus providing a dry environment on the other side of the construction. For example a sealant filling the gap between a window frame and a brick wall around the window is meant to keep rain (moisture) at the outside of the building and to prevent leaking into the building's interior.

Up until recently the sealants used in applications such as mentioned above were designed such that a sealant composition fulfilled the following three criteria (after application and optionally curing of the sealant): a) the sealant is impermeable for moisture; b) the sealant is extremely flexible; and c) the sealant shows excellent adhesion to the substrate on which it is applied.

It is a disadvantage of these modern sealants, that they cause in approximately 95% of the cases a substantial accumulation of the moisture in construction materials such as wood, plaster and limestone within a year. The moisture accumulates precisely along the joints, which are filled with the sealant, and it gradually ruins the whole construction.

It is an object of the present invention to provide sealant compositions having an improved ability to protect a construction against moisture.

SUMMARY OF THE INVENTION

This object is achieved by providing a sealant composition comprising:
- between 12 wt % and 45 wt % of a hydrophilic binder;
- between 30 wt % and 80 wt % of a filler;
- optionally a thickener;
- between 10 and 50 wt % of water, wherein the sealant composition has a pigment volume concentration (PVC) between 30% and 80%, and wherein the hydrophilic binder contains polar groups selected from the group consisting of hydroxyl, ester, carboxylic acid, amide, sulfate, phosphate, sulfosuccinate, urethane and isocyanate.

All amounts are given with respect to the total of the composition.

The hydrophilic binder may be used as a dispersion in water to provide together with other components. the sealant composition according to the present invention. In this case, the amount of solid contents of the dispersion of the binder is to be understood as the amount of the hydrophilic binder present in the sealant composition.

BRIEF DESCRIPTION OF THE DRAWINGS

The invention will be explained in detail with reference to the following Figures.

DETAILED DESCRIPTION OF THE INVENTION

Figure 1:
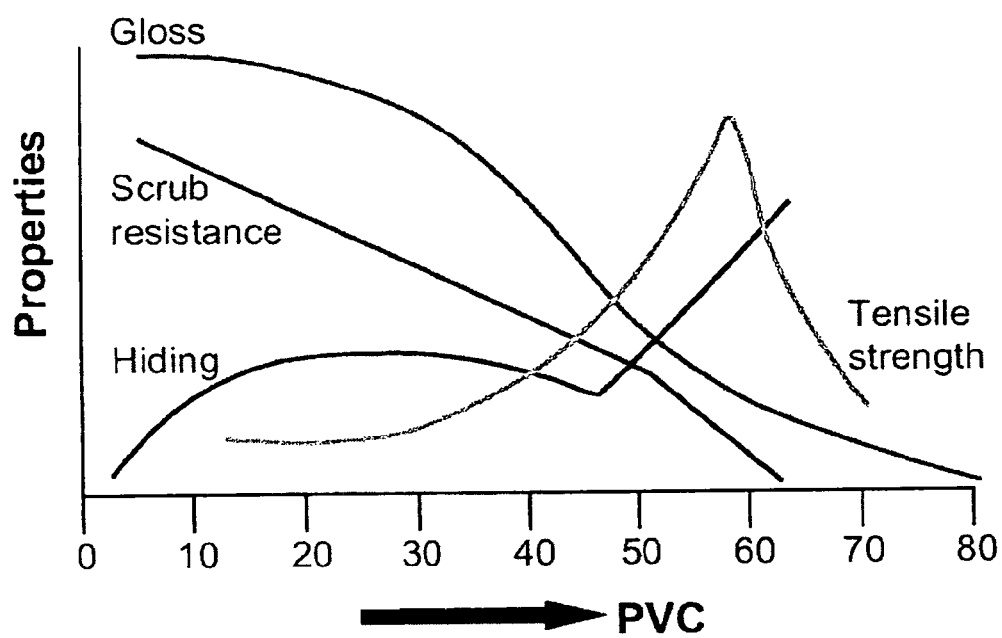
FIG. 1. Diagram of sealant properties as a function of the pigment volume concentration FIG. 2. Diagram of critical pigment volume concentration relative to properties of sealant composition FIG. 3. shows a schematic representation of a duplex action climate chamber FIG. 4. Shows a schematic representation of a test piece for measuring humidity values.

Without being bound to theory, it is believed that conventionally used sealants in construction applications have the following effect:

Each part of a system which is made of porous materials, like e.g. a house, contains moisture, which is, and this is the most important point, in constant motion, following the temperature gradient. Generally speaking, the moisture flows from inside the house to outside, from warm to cold. The above-mentioned three qualities of the modern sealants cause the destruction of the system, when the sealants are used in a system of porous, hard, not flexible materials. The actual problem is not so much to ward off the moisture coming from outside, like e.g. rain or fog, but to direct the moisture flow inside the parts of the system and let it eventually escape.

The conventional sealants are impermeable to moisture and therefore block the natural flow of moisture. Thus the moisture starts to accumulate in the joints, precisely along the sealant. In addition to it there appear, on the one hand, micro-cracks in the paint layer, and, on the other hand, micro-damages in the thin border layer of the wood, plaster or of the limestone which is in the direct contact with the sealant.

In summary it can be said that, with regard to the sealant, there are three factors which cause the destruction of the system of porous and hard materials:

1. the moisture flow which accumulates along the joints, filled with sealant;
2. the moisture from outside which penetrates into the system through the (micro-cracks in the) paint layer;
3. a thin border layer of crumbled wood, plaster or limestone (because of the stretching and contracting of the sealant), which functions as a sponge and keeps the moisture inside the material.

From the above rises a new concept of a sealant, which would harmoniously integrate with the system (i.e. construction materials) and prevents the accumulation of the moisture. Such a sealant preferably is porous, comparable in this respect with the parts of the system, which the sealant fills up/keeps together, like e.g. wood, plaster or limestone. In one embodiment the sealant is hard and rather inflexible, in another embodiment the sealant is flexible to follow the movements of the construction.

A sealant according to the present invention satisfies these requirements. The sealant according to the present invention is also at least slightly hydrophilic in order to facilitate moisture transport through the sealant.

The invention not only relates to the sealant, but also to a sealant composition. The sealant will be formed from the sealant composition after drying and optionally crosslinking of the sealant composition.

The sealant composition according to the present invention comprises between 12 wt % and 45 wt %, preferably between 15 wt % and 35 wt %, more preferably between 15 wt % and 25 wt % of a hydrophilic binder.

The hydrophilic binder may be a polymeric binder having functional groups that are able to bind to a surface of a substrate, either by physical interaction or chemical reaction. The polymeric binder preferably contains polar groups selected from the group consisting of hydroxyl, ester, carboxylic acid, amide, sulfate, phosphate, sulfosuccinate, urethane and isocyanate. Most preferred are polar groups selected from hydroxyl, carboxylic acid and ester.

The amount of polar groups in the polymeric binder ranges between 5 and 50 wt %, preferably between 10 and 40 wt %, most preferably between 15 and 36 wt %.

This high amounts of polar groups gives the polymeric binder a hydrophilic nature, which supports the transport of moisture through the sealant.

The hydrophilic binder preferably comprises one or more components selected from the group consisting of polyvinyl acetate, polyvinyl alcohol, acrylics, polyurethanes, polyisocyanate, natural based polymers, carboxylated styrenics, carboxylated butadiene styrene copolymers and carboxylated butadiene rubbers.

In a preferred embodiment of the invention, the polymeric binder is chosen from the group consisting of vinylacetate containing polymers and copolymers (for example copolymers of vinylacetate with acrylic ester, copolymers of vinylacetate with acrylic ester and VeoVA or copolymers of vinylacetate with VeoVA); carboxylated copolymers of butadiene and styrene; carboxylated copolymers of butadiene, styrene and acrylic ester; (co)polymers of acrylic esters.

VeoVa is the vinyl ester of Versatic acid 10.

Most preferred are polymeric binders comprising copolymers containing at least 20 wt % polyvinyl acetate in sealant compositions according to the present invention. Even more preferred are copolymers having 30, 40 or 50 wt % vinylacetate monomer units.

The sealant composition according to the present invention comprises between 30 wt % and 70 wt %, preferably between 40 wt % and 65 wt %, more preferably between 45 wt % and 64 wt % of a filler. Generally speaking, the type of filler is not critical for the invention. Preferably fillers to be used in a sealant composition according to the present invention are fillers comprising particles of at least one material selected from the group consisting of talc, silica, calcium carbonate and kaoline., iron oxides, natural and precipitated barium sulphates, barites, aluminium silicates, aluminium oxides, calcium magnesium carbonates, dolomites, feldspar, nepheline syenite, calcium silicates, zinc oxide, titanium dioxide, zinc phosphate, graphite, zeolites, natural fibers or other families of sulphates, carbonates, silicates, oxides and vanadates. Also combinations of fillers can be used.

In one embodiment of the invention, the filler comprises talc. Talc also provides a slightly hydrophobic character to the sealant in order to avoid that the binder system will be flushed away in contact with water.

The right balance between filler and amount of binder provides the required porosity in the binder system to enable moisture transport through the applied sealant. The fillers also provide the required hardness of the sealant compositions according to the present invention.

The sealant composition according to the present invention may further comprise a silica sol of surface modified colloidal silica in an amount of between 0 wt % and 15 wt %, preferably between 3 wt % and 14 wt %, more preferably between 5 wt % and 13 wt % with respect to the total sealant composition. Preferably, the solid contents of the silica sol is between 25 wt % and 50 wt %. This component is not considered to be a filler in the context of the present invention. Preferably the surface modified colloidal silica is an epoxy-silane surface modified colloidal silica. An advantage of the use of such silica sol is that the epoxy silane surface modification provides a stable sol which may be blended more easily with the other components of the sealant composition. In the dried sealant composition the surface modified silica particles are well and uniformly distributed throughout the entire composition and therefore provide porosity and hardness throughout the entire composition. The reactive surface groups (epoxy) may also provide crosslinking of the polymers present in the composition (e.g. the binder).

The sealant composition contains between 10 and 50 wt % water. More preferably the amount of water ranges between 15 and 30 wt %.

The sealant composition according to the present invention may comprise between 0.05 wt % and 2 wt %, preferably between 0.07 wt % and 0.5 wt %, more preferably between 0.09 wt % and 0.25 wt % of a thickener.

Suitable thickeners to be used in sealant compositions according to the present invention comprise xanthan, cellulose, clay, acrylics, polyurethanes and silicium based thickeners.

Sealant compositions according to the present invention may further comprise additives, for example wetting agents, dispersion agents, flame retardants, stabilizers, colorants, antioxidants, UV-absorbers and/or biocides.

Biocides may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides can be used in the composition of the present invention. Preferably biocides are selected from the group consisting of rocima range biocides, or biocides from the suppliers Akcros Chemicals, Ciba (BASF), Arch Chemicals, Clariant, Cognis, Cytec, Dow Chemical, ISP, Lanxess, Thor, Troy.

Sealant compositions according to the present invention preferably comprise one or more Rocima range biocide (4,5-Dichloro-2-n-octyl-4-isothiazolin-3-one (DCOIT) and 3-Iodo-2-propynyl butylcarbamate (IPBC).

The raw materials used in sealant compositions according to the present invention are completely different from the raw materials used in conventional sealant compositions. This is one of the unique properties of this sealant.

A sealant composition according to the present invention must contain enough filler, and not too much binder, such that the interior of the sealant is porous.

Such compositions and binder-filler compositions in general have a characteristic which is referred to as the pigment volume concentration (PVC), which is explained below. The pigment volume concentration (PVC) of a sealant composition according to the present invention is between 30% and 80%, preferably between 35% and 70%, more preferably between 38% and 60%, or between 40 and 58%.

If the PVC is too low, the moisture cannot diffuse through the sealant composition. Typically above a PVC of 30%, the sealant composition becomes porous and water and other small molecules can diffuse through the sealant, therefore a 'breathing' sealant structure is obtained.

If the PVC is too high, the adhesion of the sealant composition and/or sealant to the substrate may become too low. This may cause the appearance of cavities between substrate and sealant after drying of the sealant composition.

The invention also relates to the sealant, which is formed after the application and drying of the sealant composition.

The sealant comprises:
between 20 wt % and 55 wt % of a hydrophilic binder;
between 35 wt % and 80 wt % of a filler;
optionally a thickener;
less than 5 wt % of water,
wherein the pigment volume concentration (PVC) is between 30% and 80%, wherein the hydrophilic binder contains polar groups selected from the group consisting of hydroxyl, ester, carboxylic acid, amide, sulfate, phosphate, sulfosuccinate, urethane and isocyanate.

Preferably the sealant comprises:
between 25 wt % and 40 wt % of a hydrophilic binder;
between 50 wt % and 70 wt % of a filler;
optionally a thickener;
less than 5 wt % of water,
wherein the pigment volume concentration (PVC) is between 40% and 65%, and wherein the hydrophilic binder is selected from vinylacetate containing polymers and copolymers (for example copolymers of vinylacetate with acrylic ester, copolymers of vinylacetate with acrylic ester and VeoVA or copolymers of vinylacetate with VeoVA); carboxylated copolymers of butadiene and styrene; carboxylated copolymers of butadiene, styrene and acrylic ester; (co)polymers of acrylic esters.

In a further aspect, the present invention provides a sealant obtained by drying the sealant composition according to the present invention, wherein the pigment volume concentration (PVC) is between 30% and 80%, more preferably between 40% and 65%.

In a further aspect, the present invention provides use of the sealant composition according to the present invention in building and construction.

In a further aspect, the present invention provides use of the sealant according to the present invention in building and construction.

In one embodiment, the present invention also relates to a method for preparing a sealant composition comprising the steps of:
mixing between 0.05 wt % and 1 wt % of a thickener with an optionally present silica sol of surface modified colloidal silica in an amount of between 0 wt % and 15 wt % and/or demi water;
stirring the mixture for 15-45 min at 400-800 rpm;
adding of between 30 wt % and 80 wt % of a filler, and between 12 wt % and 45 wt % with respect to the total sealant composition of a hydrophilic binder, to the obtained mixture; stirring the mixture for 10-30 minutes;
adding all additional components, like the biocides, to the mixture.

Pigment Volume Concentration

The pigment volume concentration is a measure for the amount of a particular pigment (filler) or pigments (fillers) that can be added to a composition comprising a binder, for instance a polymeric binder, the composition being e.g. a coating composition, a sealant composition or an adhesive composition.

The higher the PVC, the lower is the content of polymeric binder within the composition and the higher is the portion of pigment and filler particles. The PVC thus strongly determines application properties such as gloss, scrub resistance, tensile strength, etc. (see also FIG. 1).

The PVC is calculated using equation 1:

PVC=100*(Σ$V$pigment/(Σ$V$pigment+Σ$V$non-volatile binder)    equation 1 wherein:
PVC is the pigment volume concentration (%);
Σ$V$pigment is the total pigment (or filler) volume (m$^3$);
Σ$V$non-volatile binder is the total volume of the non-volatile binder(s) (m$^3$).
Σ$V$pigment can be determined by adding up the volume of the fillers of the composition. The volume of a filler is determined by dividing the weight of the filler by the density of the filler.
Σ$V$non-volatile binder is the total volume of the non-volatile binder(s) (m$^3$).

Non-volatile binders are binders which do not evaporate upon drying of the sealant composition and which are still present in and part of the sealant composition after drying of the applied sealant. In practice, this amounts to all components of the composition, except the solvent or dispersant (like water) and the filler.

The point at which there is just sufficient polymer to wet the pigment particles is known as the critical pigment volume concentration (CPVC). Below the CPVC there is sufficient polymer for pigment wetting and above the CPVC there is not.

Figure 2:
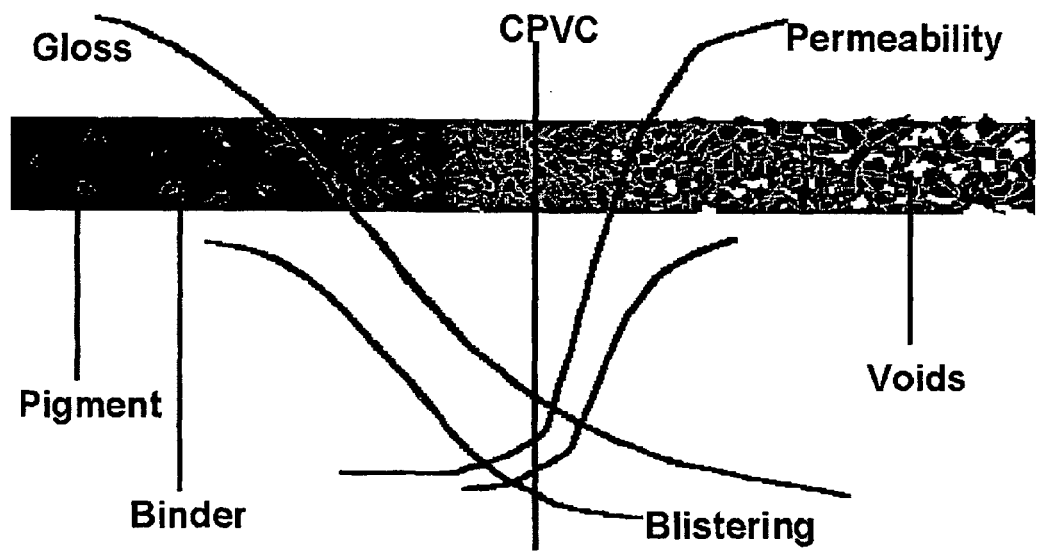

As shown in FIG. 2, at the critical pigment-volume-concentration (CPVC) many coating properties change abruptly. At the CPVC, the binder just fills the voids between the densest packed pigment particles. Above the CPVC, the pigment particles have reached their random, densest packing and voids form between the particles.

It can be seen in FIG. 2, that both gloss and blistering properties decrease as one reaches the CPVC, while permeability increase above the CPVC. Permeability properties increase because above the CPVC there are voids in the coating filled by air and the coating becomes discontinuous. Some of the properties that can be evaluated above and below the CPVC are blistering, gloss, rusting, permeability, enamel hold out, scrub resistance, tensile strength, and contrast ratio.

The CPVC can be calculated from oil absorption using the following equation:

$$CPVC = \frac{1}{1 + \frac{OA \times d}{0.93 \times 100}}$$

Where OA is the oil absorption (or average) of all pigments in linseed oil, d is the density (or average) of those pigments and 0.93 is the density of linseed oil in g/ml.

The presence of pigments and/or other fillers in a coating has a similar effect on coating performance than the presence of fillers in composites have on their performance. In a composite material comprising a polymer matrix as a continuous phase and dispersed therein a reinforcing material, e.g. fibers, the polymer of the matrix must be in intimate contact with the reinforcing material. No or insufficient intimate contact may lead to the reinforcing material (fibers) being a defect instead of reinforcing the composite material. The same theory may be applied to sealant compositions comprising fillers and/or pigments according to the present invention. If there is an insufficient amount of binder present in the composition to wet the filler particles, then the pigment becomes a defect and the properties of the sealant decrease.

Figure 3:
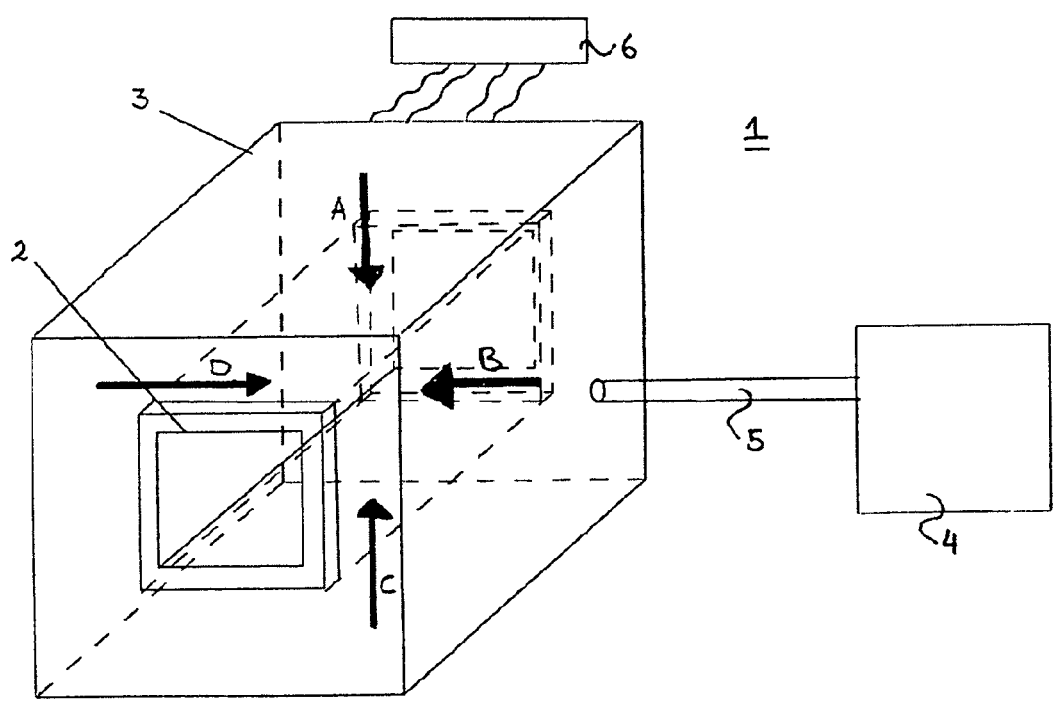

Sealant Performance Test using Duplex Action Climate Chamber (DACC) with Replaceable Test Boxes Duplex Action Climate Chamber FIG. 3 shows a schematic representation of a duplex action climate chamber.

A Duplex Action Climate Chamber 1 (DACC) comprises an inside part 2 which may be a square box, made from a construction material in combination with which the sealant composition is to be tested. The inside box may be constructed of wood, stone or plaster, preferably has two open ends and is further referred to as 'test box'. The test box is placed inside an outer chamber 3.

The DACC may further comprise a steam generator 4 with a feed pipe 5 preferably connected to the outer chamber 3 and a heat source 6.

Test-Piece; Quick Permeability Test

Figure 4:
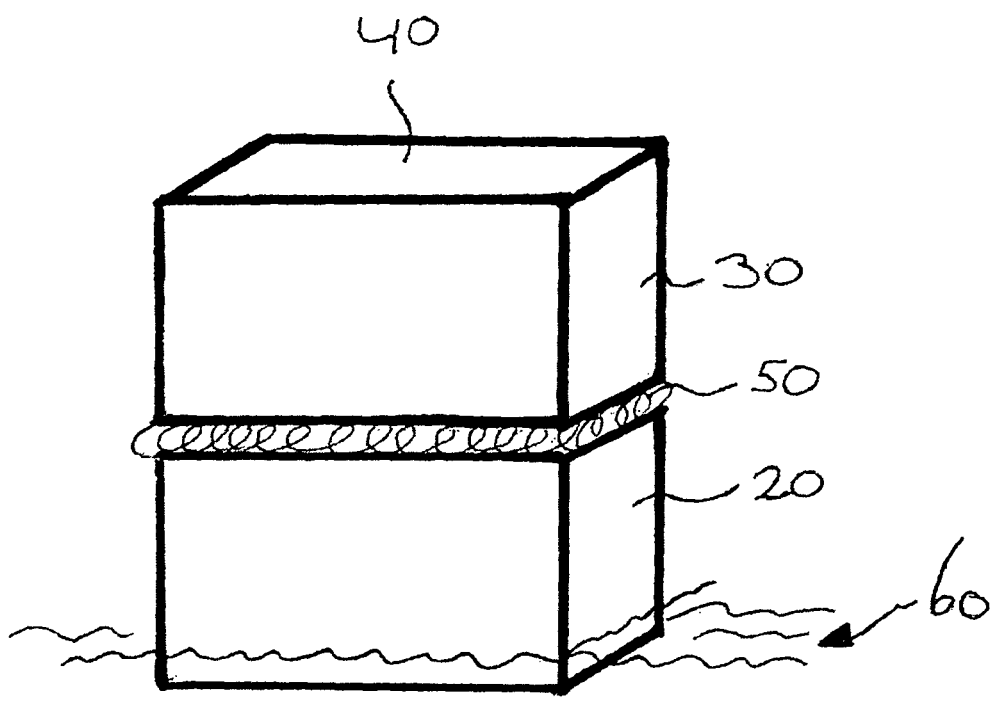

FIG. 4 shows a representation of a test piece for measuring humidity. Testpieces are prepared from two pieces of pinewood which are glued together with a sealant composition (50). Each piece of pinewood has a size of approximately 18 mm (thickness), 28 mm (length) and 22 mm (depth). The lower piece contains sidewalls 20, the upper piece sidewalls 30 and topwall 40. The lower and upper piece should not have a direct contact, but only be connected through the sealant composition (50).

After drying of the sealant composition (50), the bottom of the test pieces are placed in a layer of water (60), after which the wood will start to absorb the water. Depending on the sealant used in the testpiece, the water will also reach the upper part of the test piece and hydrate both parts of the testpiece.

Humidity measurements are performed on each side (20), (30) and on the top (40) using a TQC humidity measurement apparatus for wood, LI9050. This handheld instrument can detect humidities in the range of 6-99%.

Performance Test Method

First it is decided which combination of materials is to be tested, for example the performance of a sealant composition according to the present invention needs to be tested when used on painted wood.

A test box 2 is constructed (in the particular example of painted wood).

Materials to be tested, like e.g. fillers, sealants, compounds and such like, are applied to the joints inside of the test box 2 (in the particular example the sealant composition according to the present invention may be applied to two of the four joints of the test box 2. The other two joints may be filled with a reference (i.e. standard) sealant composition).

The test box 2 is then placed inside the outer chamber 3 (see FIG. 3).

The outer chamber 3 may be filled with steam to imitate a hot/warm and damp climate inside a building. Steam may be applied for a certain time period at regular time intervals, for example 15 minutes per day or 2 minutes per hour.

Inside the test box 2 a piece of ice may be provided (for example placed in a bowl) at regular time intervals, for example once a week or once a day.

The principal point is that in this way a good imitation of the real situation is created: the two sorts of climates which influence simultaneously the materials of which a house is built, i.e. damp and hot/warm in the interior of the house and cold on the outside. Because of the two climates a moisture current arises which flows through the sides of the test box substantially perpendicularly to them, from warm to cold, as it is in reality (indicated with arrows A, B, C and D in FIG. 2). This moisture current is the principal working agent of this climate chamber.

The Duplex Action Climate Chamber can be used to test the interaction between all kinds of construction materials (e.g. wood, plaster, bricks, limestone and so on), on the one hand, and paints, fillers, sealants, glues and putties, on the other hand. The results of testing are realistic and can be obtained, in many cases, very quickly, as the extremities of both climates, inside and outside, can be easily boosted. It is also a very cheap way of testing.

Experiments

Materials

Demiwater;

Bindzil® CC30 and CC40, epoxy-silane surface modified colloidal silica's of Akzo Nobel with a total solids content of 30 wt % and 40 wt % respectively.

Rhodopol 23, a xanthan gum based thickener of Rhodia Inc, Cranbury N.J., USA;

WorleeCryl 8263; styrene acrylate dispersion in water, solids content:52%, product of Worlee Emultex VV530, a polyvinylacetate hydrophilic binder of Synthomer Ltd, having a total solids content of 52.5 wt % and a water (hydrophilic solvent) content of 47.5 wt %; Emultex VV530 is a vinyl acetate/VeoVA10/butylacrylate terpolymer, midpoint Tg is 14 Celc, viscosity 1500 mPa·s, pH 5.5.

Plustalc D30-SQ, D30(E)-AW and D40, talc based fillers of Mondo Minerals B.V.;

Microdol A70: dolomite filler from Omya

Acrysol RM 825; non-ionic urethane thickener from Rohm and Haas

Rocima 350 and 625, a biocide of Rohm and Haas.

Synthomer 10A11, a carboxylated butadiene methacrylate polymer latex commercially available from Synthomer Ltd, Tg (midpoint) is −58 Celc, solids content 51%, viscosity 225 MPa·s, pH 8.3

Synthomer 47B40, an anionic, carboxylated styrene-butadiene copolymer latex, commercially available from Synthomer Ltd, midpoint Tg is 7 Celc, solids content 50%, viscosity 175 mPa.s, pH 9.5

Revacryl 100, an acrylic copolymer dispersion commercially available from Synthomer Ltd, midpoint Tg is 13 Celc, solids content 62%, viscosity 550 mPa·s, pH 6.0

Disperbyk 190 is a wetting and dispersion additive for aqueous systems and filler concentrates, available from BYK Schwego 6303 is a defaoming and deaerating agent available from Schwegmann Kronos 2315 is a titanium dioxide filler comprising $>=92.5\%$ TiO2 (ISO591).

Preparation of Sealant Compositions

In a first step, the thickener, the (optional) silica sol and the (optional) demi water (see Table 1) are mixed and stirred for 30 minutes at approximately 600 rpm.

In a second step, the (remaining) fillers and hydrophilic binders are added to the obtained mixture and stirred again for a maximum of 30 minutes.

In a third step the additional components, like the biocides and additives are added to the mixture.

Table 1 shows the compositions of four examples of sealant compositions according to the present invention that were prepared in the above described way.

TABLE 1 sealant compositions according to the present invention.

| Compound (wt %) | EXAMPLE 1 | EXAMPLE 2 | EXAMPLE 3 | EXAMPLE 4 |
|---|---|---|---|---|
| Demi water | | 7.48 | | 7.47 |
| Bindzil CC 40 | 12.4 | | 9.81 | |
| Rhodopol 23 | 0.1 | 0.2 | 0.16 | 0.2 |
| WorleeCryl 8263 | | | | 48.5 |
| Microdol A70 | | | | 43.23 |
| Emultex V530 | 48.3 | 48.49 | 38.18 | |
| Plustalc D30-SQ | | 43.23 | 51.34 | |
| Plustalc D30-AW | 38.1 | | | |
| Acrylsol RM 825 | 0.4 | 0.4 | 0.35 | 0.4 |
| Rocima 350 | 0.5 | | | |
| Rocima 625 | 0.2 | 0.2 | 0.16 | 0.2 |
| Total | 100 | 100 | 100 | 100 |
| Water content | ≈30 | ≈30 | ≈28 | 30 |
| PVC (%) | 34 | 40 | 46 | 40 |
| CPVC (%) | 63 | 63 | 63 | 77 |

The sealant compositions were tested according to the sealant performance test using the Duplex Action Climate Chamber (DACC) with replaceable Test Boxes as described above.

A wooden test box 2 was made with four side panels. Two of the seams were sealed with a standard sealant and on the other two seams were sealed with a sealant composition according to one of the above shown examples. The sealants were overcoated with 2 layers of coatings (e.g. paint).

This box was then tightly fixed in an outer chamber 3 (e.g. a plastic box). The test box extends approximately 10 cm out of the outer chamber. The seams between the test box and the outer chamber are also sealed: at one side with a standard sealant; at the other side with a sealant composition according to one of the examples described above.

A steam generator 4 is connected to the outer chamber 3 via pipe 5.

The performed climate steps were:
1) apply steam to the outer chamber 3 for 15 minutes per day; and
2) a bowl of 80 gram ice was placed in the test box once every day.

This test has been performed to imitate quickly weather influences of which wood is exposed in for example buildings.

The results of the sealant performance tests are summarized in Table 2.

TABLE 2

Results of the sealant performance test of examples 1-4 and a reference sealant

|  | EXAMPLE 1 | EXAMPLE 2 | EXAMPLE 3 | EXAMPLE 4 | Reference: standard sealant (Bison acrylate) |
|---|---|---|---|---|---|
| 1 week cycle | OK | OK | OK | OK | Cracks |
| 2 weeks cycle | OK | Cracks | cracks | OK | Cracks |
| 1 month cycle | OK | Cracks | cracks | OK | |
| 3 months cycle | OK | Cracks | cracks | OK | |
| 6 months cycle | OK | Cracks | cracks | OK | |
| Rot | None | None | None | None | Moulded around sealant |

From this test it is shown that the standard sealant shows already cracks after 1 week, while the sealants according to examples 1-4 with a compositions according to the present invention stay intact for at least 6 months. After these 6 months, the standard sealant shows rot along the seams wherein the sealant is present. The sealant compositions according to the present invention (examples 1-4) do not show any rot at all. This same result was achieved with compositions without the presence of biocides.

The results also show, in this particular case, that moisture accumulates exactly behind the joints, which are sealed by an impermeable, not porous, sealant, which leads eventually to the moulding of the wood.

Experiment 5

Several sealant compositions have been prepared in order to evaluate the effect of binder, PVC in the quick water absorption test as shown in FIG. 4.

TABLE 3 sealant compositions

| | Sealant composition: | | | | | | | |
|---|---|---|---|---|---|---|---|---|
| | 1.0 | 1.1 | 1.2 | 1.3 | 2.0 | 2.1 | 2.2 | 2.3 |
| Emultex V530 | 100 | 30 | 42.9 | 46.8 | | | | |
| Synthomer 10A11 | | | | | 100 | 30 | 42.9 | 46.8 |
| Bindzil CC40 Add while stirring | | 4.2 | 8.6 | 8 | | 4.2 | 8.6 | 8 |
| Disperbyk 190 | | 3 | 2.15 | 2 | | 3 | 2.15 | 2 |
| Schwego 6303 Add and slow stirring maintain 30 min | | 0.2 | 0.15 | 0.13 | | 0.2 | 0.15 | 0.13 |
| Plustalc D40 | 0 | 49 | 35.1 | 32.7 | 0 | 49 | 35.1 | 32.7 |
| Kronos 2315 Add while slowly stirring | 0 | 13.6 | 9.7 | 9 | 0 | 13.6 | 9.7 | 9 |
| Acrysol RM825 | | 0 | 1.4 | 1.37 | | 0 | 1.4 | 1.37 |
| Total | 100 | 100 | 100 | 100 | 100 | 100 | 100 | 100 |
| PVC | 0 | 55.00 | 41.6 | 38.4 | 0 | 55.00 | 41.6 | 38.4 |
| CPVCvol | | 42.5 | 42.5 | 42.5 | | 42.5 | 42.5 | 42.5 |
| % water | 48 | 17.8 | 25.6 | 27.0 | 49 | 17.2 | 26.2 | 27.7 |
| % binder | 52 | 15.7 | 22.5 | 24.6 | 51 | 15.3 | 21.9 | 23.9 |

TABLE 4 sealant compositions

| Sealant composition | 3.0 | 3.1 | 3.2 | 3.3 | 5.0 | 5.1 | 5.2 |
|---|---|---|---|---|---|---|---|
| Synthomer 47B40 | | | | | 100 | 30 | 42.9 |
| Revacryl 100 | 100 | 30 | 42.9 | 46.8 | | | |
| Bindzil CC40 | | 4.2 | 8.6 | 8 | | 4.2 | 8.6 |
| Add while stirring | | | | | | | |
| Disperbyk 190 | | 3 | 2.15 | 2 | | 3 | 2.15 |
| Schwego 6303 | | 0.2 | 0.15 | 0.13 | | 0.2 | 0.15 |
| Add and slow stirring maintain 30 min | | | | | | | |
| Plustalc D40 | 0 | 49 | 35.1 | 32.7 | 0 | 49 | 35.1 |
| Kronos 2315 | 0 | 13.6 | 9.7 | 9 | 0 | 13.6 | 9.7 |
| Add while slowly stirring | | | | | | | |
| Acrysol RM 825 | | 0 | 1.7 | 1.37 | | 0 | 1.4 |
| Total | 100 | 100 | 100 | 100 | 100 | 100 | 100 |
| PVC | | 55.00 | 41.00 | 38.00 | | 55 | 41 |
| CPVCvol | | 42.50 | 42.50 | 42.50 | | 42.5 | 42.5 |
| Water wt % | 38 | 17.2 | 26.2 | 27.7 | 50 | 17.8 | 25.6 |
| binder wt % | 62 | 15.3 | 21.9 | 23.9 | 50 | 15.7 | 22.5 |

Testpieces are prepared from two pieces of dry pinewood which are glued together with a sealant composition (50). Each piece of pinewood has a size of approximately 18 mm (thickness), 28 mm (length) and 22 mm (depth). The lower piece contains sidewalls 20, the upper piece sidewalls 30 and topwall 40. The lower and upper piece should not have a direct contact, but only be connected through the sealant composition (50).

Test pieces have been constructed with the sealant compositions as indicated above. After drying of the sealant composition (50), the bottom of the testpieces are placed in a layer of water (60), after which the wood will start to absorb the water. Depending on the sealant used in the testpiece, the water will also reach the upper part of the test piece and hydrate both parts of the testpiece.

Humidity measurements are performed on each side (20) (indicated in the table as measuring point 2 (mp2)), (30 (indicated as mp3) and on the top (40) (indicated as mp4) using a TQC humidity measurement apparatus for wood, LI9050. This handheld instrument can detect humidities in the range of 6-99%. Measurements are conducted at room temperature.

The pine wood has humidity values typically below 6 when dry. Water absorption will immediately start in the bottom part of the testpiece, giving a quick increase of the humidity values till about 20% RH. The sealant acts as a barrier for water. When no sealant is present, the water will reach the upper part of the testpiece (30) in less than half an hour. Preferred sealants according to the present invention allow transport of water to the upper part of the testpiece within reasonable periods of time.

Test results are reported in Table 6.

In addition to the sealant compositions comprising filler, a number of sealant compositions have been prepared using the components in Table 5. Test results of the water absorption test, show no or very limited absorption of water in the upper part of the testpiece after more than 300 minutes water absorption.

TABLE 5 compositions and test results.

| Sealant composition | Test time (min) | Mp 2 (% RH) | Mp 3 (% RH) | Mp 4 (% RH) |
|---|---|---|---|---|
| 80% w Emultex VV530 + 20% w Bindzil CC40 | 303 | 24 | 7 | 0 |
| 80% w Synthomer 10A11 + 20% w Bindzil CC40 | 305 | 24 | 6 | 0 |
| 80% w Revacryl 100 + 20% w Bindzil CC40 | 306 | 24 | 0 | 0 |
| 80% w Synthomer 47B40 + 20% w Bindzil CC40 | 307 | 21 | 0 | 0 |

TABLE 6 testresults of water absorption test

| Sealant composition | PVC | time (min) | mp2 % RH | mp3 % RH | mp4 % RH | time (min) | mp2 % RH | mp3 % RH | mp4 % RH | time (min) |
|---|---|---|---|---|---|---|---|---|---|---|
| Testpiece-no sealant | no | 42 | 23 | 21 | 16 | 90 | 26 | 24 | nd | 220 |
| 1.0 | 0 | 48 | 17 | 3 | 0 | 94 | 24 | 3 | 0 | 227 |
| 1.1 | 55.3 | 15 | 17 | 7 | 2 | 64 | 21 | 18 | 19 | 192 |
| 1.2 | 41.6 | 17 | 14 | 0 | 0 | 67 | 18 | 7 | 0 | 193 |
| 1.3 | 38.4 | 19 | 22 | 0 | 0 | 69 | 22 | 7 | 0 | 195 |
| 2.0 | 0 | 46 | 23 | 0 | 0 | 92 | 23 | 6 | 0 | 225 |
| 2.1 | 55.3 | 21 | 13 | 7 | 0 | 70 | 11 | 10 | 7 | 197 |
| 2.2 | 41.6 | 24 | 20 | 6 | 0 | 71 | 25 | 7 | 0 | 204 |
| 2.3 | 38.4 | 26 | 13 | 6 | 0 | 72 | 19 | 3 | 0 | 206 |
| 3.0 | 0 | 23 | 19 | 0 | 0 | 68 | 21 | 0 | 0 | 187 |
| 3.1 | 55.3 | 34 | 19 | 3 | 0 | 79 | 19 | 7 | 0 | 212 |
| 3.2 | 41.6 | 37 | 20 | 0 | 0 | 80 | 23 | 4 | 0 | 214 |
| 3.3 | 38.4 | 38 | 21 | 0 | 0 | 82 | 25 | 3 | 0 | 216 |
| 5.0 | 0 | 21 | 17 | 0 | 0 | 68 | 21 | 0 | 0 | 185 |
| 5.1 | 55.3 | 53 | 22 | 5 | 0 | 98 | 26 | 7 | 0 | 231 |
| 5.2 | 41.6 | 51 | 24 | 2 | 0 | 96 | 24 | 6 | 0 | 230 |

TABLE 6-continued testresults of water absorption test

| | | | | | | | | | | |
|---|---|---|---|---|---|---|---|---|---|---|
| DC 796 silicone-sealant | 23 | 40 | 20 | 0 | 0 | 84 | 25 | 5 | 0 | 218 |

| Sealant composition | PVC | mp2 % RH | mp3 % RH | mp4 % RH | time (min) | mp2 % RH | mp3 % RH | mp4 % RH |
|---|---|---|---|---|---|---|---|---|
| Testpiece-no sealant | no | 26 | 26 | 30 | 269 | 27 | 26 | 34 |
| 1.0 | 0 | 25 | 5 | 0 | 275 | 25 | 7 | 0 |
| 1.1 | 55.3 | 26 | 26 | 30 | 240 | 29 | 27 | 30 |
| 1.2 | 41.6 | 24 | 15 | 10 | 242 | 24 | 16 | 15 |
| 1.3 | 38.4 | 23 | 8 | 0 | 245 | 24 | 8 | 5 |
| 2.0 | 0 | 23 | 7 | 0 | 273 | 23 | 7 | 0 |
| 2.1 | 55.3 | 24 | 23 | 27 | 247 | 24 | 27 | 27 |
| 2.2 | 41.6 | 25 | 8 | 0 | 251 | 26 | 8 | 0 |
| 2.3 | 38.4 | 26 | 7 | 0 | 256 | 26 | 7 | 0 |
| 3.0 | 0 | 27 | 0 | 0 | 311 | 27 | 2 | 0 |
| 3.1 | 55.3 | 22 | 7 | 7 | 262 | 23 | 7 | 7 |
| 3.2 | 41.6 | 23 | 7 | 0 | 264 | 24 | 8 | 0 |
| 3.3 | 38.4 | 26 | 7 | 0 | 266 | 26 | 7 | 0 |
| 5.0 | 0 | 24 | 0 | 0 | 310 | 24 | 0 | 0 |
| 5.1 | 55.3 | 27 | 7 | 6 | 279 | 26 | 15 | 8 |
| 5.2 | 41.6 | 24 | 7 | 0 | 277 | 24 | 7 | 0 |
| DC 796 silicone-sealant | 23 | 25 | 7 | 0 | 267 | 25 | 7 | 0 |

What is claimed is:

1. A sealant composition comprising:
   a. between 12 wt % and 45 wt % of a hydrophilic binder;
   b. between 30 wt % and 80 wt % of a filler;
   c. optionally a thickener;
   d. between 10 and 50 wt % of water,
   wherein the composition has a pigment volume concentration (PVC) between 30% and 80%, and
   wherein the hydrophilic binder contains polar groups and the polar groups of the hydrophilic binder are one or more of hydroxyl, ester, carboxylic acid, amide, sulfate, phosphate, sulfosuccinate, urethane and isocyanate, and wherein the composition further comprises a silica sol of epoxy-silane surface modified colloidal silica in an amount of between 3 wt % and 14 wt %.

2. The sealant composition according to claim 1, wherein the amount of polar groups in the ranges between 5 and 50 mol %.

3. The sealant composition according to claim 1, wherein the polar groups are one or more of hydroxyl, carboxylic acid and ester.

4. The sealant composition according to claim 1, wherein the hydrophilic binder is one or more of polyvinyl acetate, polyvinyl alcohol, acrylics, polyurethanes, polyisocyanate, natural based polymers, carboxylated styrenics, carboxylated butadiene styrene copolymers and carboxylated butadiene rubbers.

5. The sealant composition according to claim 1, wherein the hydrophilic binder is one or more of vinylacetate containing polymers and copolymers; carboxylated copolymers of butadiene and styrene; carboxylated copolymers of butadiene, styrene and acrylic ester; (co)polymers of acrylic esters; styrene acrylate; and carboxylated butadiene methacrylate.

6. The sealant composition according to claim 1, wherein the hydrophilic binder comprises copolymers containing at least 20 wt % polyvinyl acetate.

7. The sealant composition according to claim 1, wherein the composition comprises between 30 wt % and 70 wt % of the filler.

8. The sealant composition according to claim 1, wherein the filler comprises talc.

9. The sealant composition according to claim 1, wherein the amount of water ranges between 15 and 30 wt %.

10. A sealant obtained by applying and drying the sealant composition according to claim 1.

11. A sealant, comprising :
    a. between 20 wt % and 55 wt % of a hydrophilic binder;
    b. between 35 wt % and 80 wt % of a filler;
    c. optionally a thickener;
    d. less than 5 wt % of water,
    wherein the pigment volume concentration (PVC) is between 30% and 80%, wherein the hydrophilic binder contains polar groups and the polar groups of the hydrophilic binder is one or more of hydroxyl, ester, carboxylic acid, amide, sulfate, phosphate, sulfosuccinate, urethane and isocyanate, and wherein the composition further comprises a silica sol of epoxy-silane surface modified colloidal silica in an amount of between 3 wt % and 14 wt %.

12. The sealant according to claim 11, wherein the sealant comprises
    a. between 25 wt % and 40 wt % of the hydrophilic binder;
    b. between 50 wt % and 70 wt % of the filler;
    c. optionally, the thickener;
    d. less than 5 wt % of water,
    wherein the pigment volume concentration (PVC) is between 40% and 65%, and wherein the hydrophilic binder is one or more of vinylacetate containing polymers and copolymers; carboxylated copolymers of butadiene and styrene; carboxylated copolymers of butadiene, styrene and acrylic ester; and (co)polymers of acrylic esters.

13. A method for preparing the sealant composition according to claim 1, comprising the steps of:
    a. mixing between 0.05 wt % and 1 wt % of the thickener with silica sol of epoxy-silane surface modified colloidal silica in an amount of between 3 wt % and 15 wt % and/or demi water;
    b. stirring the mixture for 15-45 min at 400-800 rpm;
    c. adding of between 30 wt % and 80 wt % of the filler, and between 12 wt % and 45 wt % with respect to the total sealant composition of the hydrophilic binder, to the obtained mixture; stirring the mixture for 10-30 minutes;

d. adding all additional components to the mixture while stirring.

14. The sealant composition according to claim 1, wherein the amount of polar groups in the binder ranges between 5 and 50 mol %, wherein the polar groups are one or more of hydroxyl, carboxylic acid and ester, and wherein the hydrophilic binder is selected from the group consisting of polyvinyl acetate, polyvinyl alcohol, acrylics, polyurethanes, polyisocyanate, natural based polymers, carboxylated styrenics, carboxylated butadiene styrene copolymers and carboxylated butadiene rubbers.

15. The sealant composition according to claim 14, wherein the hydrophilic binder comprises copolymers containing at least 20 wt % polyvinyl acetate, wherein the composition comprises between 30 wt % and 70 wt % of the filler, and wherein the filler comprises talc.

16. The sealant composition according to claim 15, wherein the amount of water ranges between 15 and 30 wt %.

* * * * *